United States Patent
Ramaswamy et al.

(10) Patent No.: US 9,748,592 B2
(45) Date of Patent: Aug. 29, 2017

(54) ELECTROLYTE GENERATION WITHIN A FUEL CELL

(75) Inventors: Sitaram Ramaswamy, West Hartford, CT (US); Michael E. Gorman, South Glastonbury, CT (US)

(73) Assignee: DOOSAN FUEL CELL AMERICA, INC., Atlanta, GA (US)

(*) Notice: Subject to any disclaimer, the term of this patent is extended or adjusted under 35 U.S.C. 154(b) by 188 days.

(21) Appl. No.: 14/374,705

(22) PCT Filed: Jan. 26, 2012

(86) PCT No.: PCT/US2012/022622
§ 371 (c)(1),
(2), (4) Date: Jul. 25, 2014

(87) PCT Pub. No.: WO2013/112149
PCT Pub. Date: Aug. 1, 2013

(65) Prior Publication Data
US 2014/0370402 A1    Dec. 18, 2014

(51) Int. Cl.
*H01M 8/16*      (2006.01)
*H01M 8/086*     (2016.01)
*H01M 8/04007*   (2016.01)
*H01M 8/04082*   (2016.01)

(52) U.S. Cl.
CPC ....... *H01M 8/086* (2013.01); *H01M 8/04007* (2013.01); *H01M 8/04201* (2013.01); *H01M 2300/0008* (2013.01)

(58) Field of Classification Search
CPC ............................ H01M 8/086; H01M 8/04007
See application file for complete search history.

(56) References Cited

U.S. PATENT DOCUMENTS

| | | | |
|---|---|---|---|
| 3,926,745 A | 12/1975 | Czuha, Jr. | |
| 3,972,731 A | 8/1976 | Bloomfield et al. | |
| 4,001,041 A | 1/1977 | Menard | |
| 4,200,682 A | 4/1980 | Sederquist | |
| 4,345,008 A * | 8/1982 | Breault | H01M 8/04119 429/120 |
| 4,414,291 A | 11/1983 | Breault | |
| 4,530,887 A | 7/1985 | Maru et al. | |
| 4,612,262 A | 9/1986 | Grevstad | |
| 4,855,194 A | 8/1989 | Wright | |

(Continued)

FOREIGN PATENT DOCUMENTS

| JP | 59012571 A | 1/1984 |
| JP | 2098054 A  | 4/1990 |
| JP | 5205757 A  | 8/1993 |

OTHER PUBLICATIONS

International Search Report and Written Opinion of the International Searching Authority for International application No. PCT/US2012/022622 dated Oct. 18, 2012.

*Primary Examiner* — Olatunji Godo
(74) *Attorney, Agent, or Firm* — Carlson, Gaskey & Olds

(57) ABSTRACT

An exemplary method of providing an electrolyte for a fuel cell comprises including a electrolyte precursor within a fuel cell. An electrolyte is generated within the fuel cell from the precursor. An exemplary fuel cell system includes a cell stack assembly. A manifold is associated with the cell stack assembly. An electrolyte precursor is within at least one of the cell stack assembly or manifold for generating an electrolyte within a fuel cell.

25 Claims, 2 Drawing Sheets

(56) References Cited

U.S. PATENT DOCUMENTS 6,416,898 B1 * 7/2002 Ohzu .................. H01M 8/1016
429/492
7,329,470 B2 2/2008 Adams et al.

* cited by examiner

ELECTROLYTE GENERATION WITHIN A FUEL CELL

BACKGROUND

Fuel cells are devices that are useful for generating electrical power. There are different types of fuel cells that have been developed and are under continuing investigation. Phosphoric acid fuel cells (PAFC) utilize phosphoric acid as an electrolyte for facilitating the electrochemical reaction that is used for generating electrical power.

One of the challenges associated with PAFCs is maintaining an adequate amount of phosphoric acid. It is known that the amount of phosphoric acid in a PAFC decreases over the useful lifetime of the PAFC. Proposals have been made for mitigating the reduction of phosphoric acid within a PAFC. Even with such measures, there still is a need for maintaining an adequate amount of phosphoric acid. Any attempt to extend the useful life of a PAFC requires even more phosphoric acid over the lifetime of the PAFC.

One of the challenges associated with attempting to increase the amount of phosphoric acid within a PAFC at the beginning of its life is that too much phosphoric acid can actually result in performance degradation. For example, too much phosphoric acid may prevent reactant mass transfer within the fuel cell.

SUMMARY

An exemplary method of providing an electrolyte for a fuel cell comprises including a electrolyte precursor within a fuel cell. An electrolyte is generated within the fuel cell from the precursor.

An exemplary fuel cell system includes a cell stack assembly. A manifold is associated with the cell stack assembly. An electrolyte precursor is within at least one of the cell stack assembly or the manifold for generating an electrolyte within a fuel cell.

The various features and advantages of disclosed examples will become apparent to those skilled in the art from the following detailed description. The drawings that accompany the detailed description can be briefly described as follows.

DETAILED DESCRIPTION

Disclosed examples configurations of a fuel cell system include an electrolyte precursor within a cell stack assembly or a manifold. The electrolyte precursor facilities generating electrolyte within the fuel cell system for use during fuel cell operation.

Figure 1:
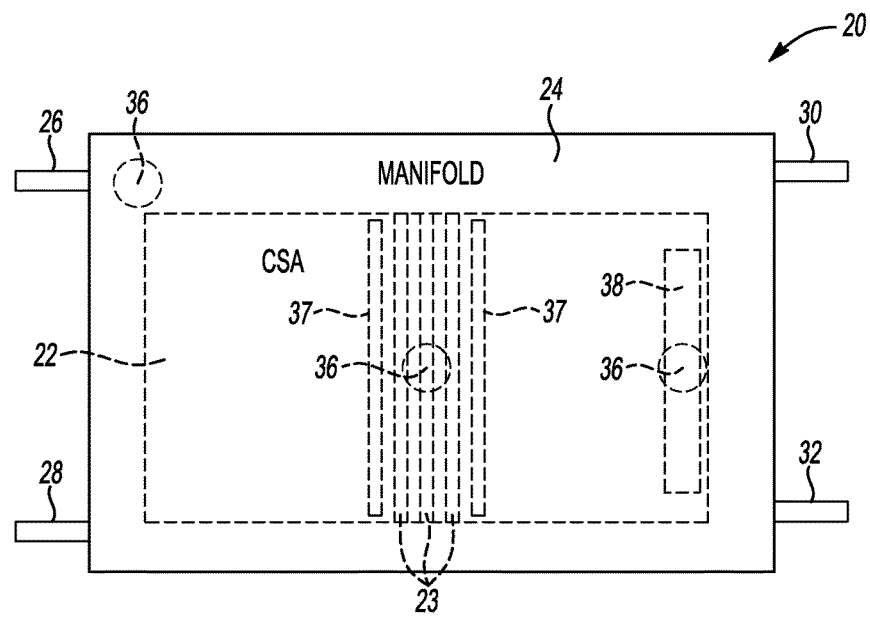
FIG. 1 schematically illustrates selected portions of a fuel cell system designed according to an embodiment of this invention.

FIG. 1 schematically shows a fuel cell system 20. A cell stack assembly 22 comprises a plurality of individual fuel cells 23 that each facilitate an electrochemical reaction for generating electrical power. Only some cells 23 are schematically shown in FIG. 1. As those skilled in the art appreciate, several cells are arranged next to each other in a sub-stack and several sub-stacks are assembled into the complete or full cell stack assembly.

In this example, the fuel cell system 20 comprises a phosphoric acid fuel cell (PAFC) system. Phosphoric acid is utilized as an electrolyte within the fuel cell system 20 to facilitate the electrochemical reaction used for generating electricity.

A manifold 24 at least partially surrounds the cell stack assembly 22. A variety of manifold configurations may be used depending on the particular configuration of the fuel cell system 20. Known manifolds are useful for some embodiments.

In the illustrated example, the manifold 24 facilitates providing reactants to the cell stack assembly 22, such as air through an air inlet 26 and fuel through a fuel inlet 28. The manifold 24 includes outlets or exhaust ports 30 and 32 for removing heat, water and excess fuel during fuel cell operation. The byproducts of the electrochemical reaction in a PAFC are well known.

The example of FIG. 1 includes an electrolyte precursor schematically shown at 36 within at least one of the cell stack assembly 22 or the manifold 36. FIG. 1 schematically shows an electrolyte precursor 36 near a center of one of the sub-stacks, which is near a center of the cell stack assembly 22. That sub-stack includes cooler plates 37 at opposite ends of the sub-stack. The cooler plates 37 have known thermal exchange fluid flowing through them for taking away waste heat generated during operation of the cells. The individual cells 23 nearest the center of the sub-stack and furthest from the cooler plates 37 tend to be warmer than the cells in other portions of the cell stack assembly 22. The hotter zones within a cell stack assembly 22 tend to be those areas where there is more significant electrolyte loss. Including the electrolyte precursor 36 in such areas allows for generating additional electrolyte within those area of the fuel cell system 20.

The example of FIG. 1 also shows an electrolyte precursor 36 in the air flow path upstream of the cell stack assembly 22. In one example, the electrolyte precursor 36 is placed inside the manifold 24 as close as possible to the reactant flow-field entry.

FIG. 1 also schematically shows an electrolyte precursor 36 within an acid condensation zone 38 of the cell stack assembly 22.

Regardless of where the electrolyte precursor 36 is placed within the fuel cell system 20, it is useful for generating electrolyte for use during fuel cell operation.

Figure 2:
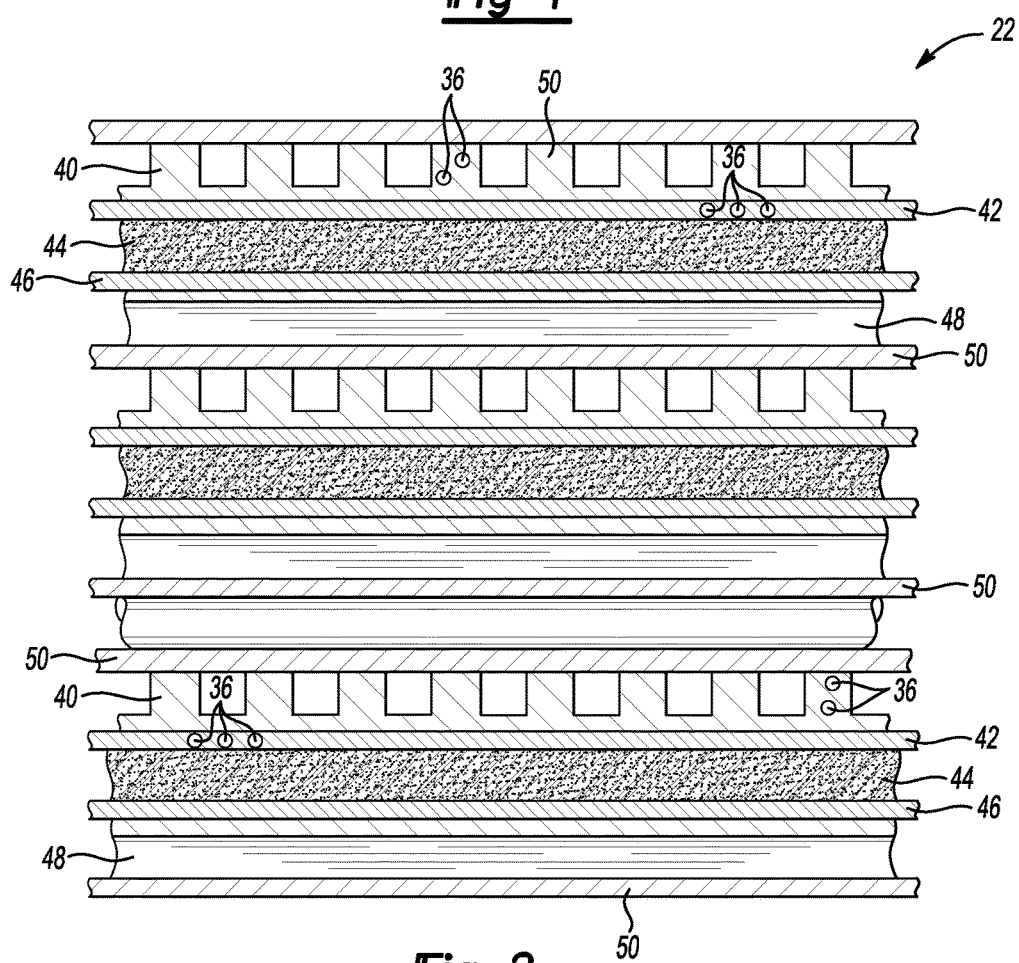
FIG. 2 is a cross-sectional diagram schematically illustrating selected portions of a cell stack assembly designed to an embodiment of this invention.

FIG. 2 schematically shows selected portions of the cell stack assembly 22. A cathode electrode layer 40 is immediately adjacent a cathode catalyst layer 42. An electrolyte retaining matrix 44 is between the cathode catalyst layer 42 and an anode catalyst layer 46. An anode electrode layer 48 is on an opposite side of the catalyst layer 46. An optional separator plate 50 separates the anode electrode layer 48 from the cathode electrode layer 40 of an adjacent cell. In FIG. 2, at least some of the electrolyte precursor 36 is provided within at least some of the catalyst layers 42 or 46. Additionally, some of the electrolyte precursor 36 is shown within the cathode electrode layer 40. In some examples, the layers of the cell stack assembly 22 that include the electrolyte precursor 36 are made porous and granules of the precursor are disbursed within the layer in at least some of the pores.

Figure 3:
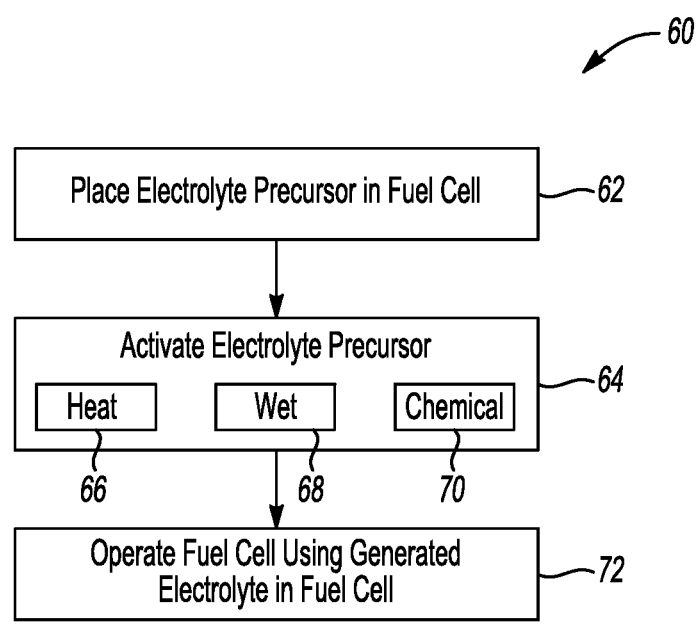
FIG. 3 is a flow chart diagram summarizing an example approach.

FIG. 3 includes a flow chart diagram 60 that summarizes an example approach for providing an electrolyte within a fuel cell. The electrolyte precursor is placed within the fuel cell at 62. At 64, the electrolyte precursor is activated for generating the electrolyte within the fuel cell. The example of FIG. 3 includes a plurality of ways in which to active the electrolyte precursor. At 66 heat is used in some examples for activating the electrolyte precursor. At 68 some examples including wetting the electrolyte precursor by increasing the humidity in a location that includes the precursor or by applying liquid to the precursor. The example of FIG. 3 also includes, as an option, utilizing a chemical reaction at 70 for activating the electrolyte precursor. Some examples will include a combination of two or more of the activation techniques shown at 66-70. At 72 the electrolyte that is generated from the electrolyte precursor is used for operating the fuel cell.

There are several advantageous benefits associated with utilizing an electrolyte precursor within a fuel cell for providing electrolyte to that fuel cell. In general, precursors occupy less volume than the electrolyte, itself. Therefore, it is possible to include more precursor than actual electrolyte in some instances and, thereby, increase the amount of electrolyte available within the fuel cell over the lifetime of the fuel cell.

Precursors may be more stable than the actual electrolyte, itself. This allows for a longer period of time during which the electrolyte may be available within the fuel cell.

Some precursors are more readily incorporated than the actual electrolyte into a variety of locations within the structure of a fuel cell. Precursor granules, for example, may be imbedded in different layers of a cell stack assembly or may be included into a manifold, for example. The example of FIG. 2 includes the electrolyte 36 precursor imbedded into or incorporated into one or more of the layers of the cell stack assembly 22. Another example includes one or more containers of the precursor situated within the manifold 24 where the precursor is selectively exposed to an agent for activating the precursor to generate electrolyte for the fuel cell.

Utilizing an electrolyte precursor instead of the electrolyte, itself, reduces the storage requirements and constraints within a fuel cell. Placing an electrolyte precursor within a fuel cell minimizes or avoids any issues related to adding electrolyte to the fuel cell from an outside source once the fuel cell has been operating.

Another feature of utilizing an electrolyte precursor is that it reduces the amount of electrolyte that needs to be included at the beginning of the fuel cell life. This allows for avoiding at least some of the negative impact on performance that high electrolyte levels tend to introduce.

In some examples, the precursor is provided within the fuel cell in an amount that is sufficient to provide all of the electrolyte needed throughout the useful lifetime of the fuel cell. In such examples, it is possible to utilize a process for activating the precursor within the fuel cell instead of introducing the electrolyte, itself, at the beginning of the fuel cell life. For example, introducing water or a dilute acid spray into a fuel cell that includes the electrolyte precursor prior to initially operating the fuel cell allows for generating the electrolyte within the fuel cell prior to that initial use. Throughout the lifetime of the fuel cell, additional amounts of the precursor may be utilized to generate additional electrolyte within a fuel cell. Periodically or continuously generating the electrolyte within the fuel cell avoids the impact of electrolyte loss or reduction within the fuel cell and can provide for a more consistent and extended performance of the fuel cell.

Additionally, by utilizing a precursor as the main source of electrolyte within a fuel cell can allow for achieving more uniform diffusion and a more even distribution of the electrolyte throughout an entire substrate in the fuel cell since the precursor is integrated into the matrix of the cell stack assembly, itself. Another feature of one such example is that eliminating an electrolyte fill step prior to initial fuel cell use reduces the cost of manufacturing.

In some PAFC embodiments, the precursor comprises phosphorous pentoxide ($P_4O_{10}$). This precursor is available, for example, as a white crystalline solid that is the anhydride of phosphoric acid. Generating phosphoric acid within a PAFC using phosphorous pentoxide as the precursor can be regulated by periodically hydrating the phosphorous pentoxide, for example. In one example, the rate of electrolyte production is configured to correspond to the rate of electrolyte loss or reduction within the fuel cell. In other words, a relatively consistent level of phosphoric acid or another electrolyte within a fuel cell may be obtainable with an example embodiment of this invention.

Including an electrolyte precursor within a fuel cell and using that for generating electrolyte within the fuel cell eliminates many of the shortcomings and drawbacks associated with previous attempts at providing phosphoric acid within a PAFC. The disclosed example techniques are useful for generating a variety of electrolytes within a fuel cell.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A phosphoric acid fuel cell system, comprising:
   a cell stack assembly;
   at least one porous component having a plurality of pores; and
   a plurality of granules of an electrolyte precursor within at least some of the pores of the porous component for generating an electrolyte within the fuel cell.

2. The fuel cell system of claim 1, wherein the generated electrolyte comprises phosphoric acid.

3. The fuel cell system of claim 2, wherein the electrolyte precursor comprises phosphorous pentoxide.

4. The fuel cell system of claim 1, comprising a manifold associated with the cell stack assembly and wherein at least some electrolyte precursor is in the manifold.

5. The fuel cell system of claim 1, wherein the cell stack assembly comprises a catalyst layer and an electrode layer, at least one of the catalyst layer or the electrode layer is the porous component and wherein the electrolyte precursor is in the at least one of the catalyst layer or the electrode layer.

6. The fuel cell system of claim 1, wherein the cell stack assembly has a center of the stack and the electrolyte precursor is near the center of the stack.

7. The fuel cell system of claim 1, wherein
   the cell stack assembly includes a plurality of cells and at least one cooler plate;
   first ones of the cells are spaced further from the cooler plate than second ones of the cells;
   the first ones of the cells include a first amount of the electrolyte precursor; and
   the second ones of the cells include a second, lower amount of the electrolyte precursor.

8. The fuel cell system of claim 1, wherein the fuel cell comprises an acid condensation zone and the electrolyte precursor is in the acid condensation zone.

9. The fuel cell system of claim 1, wherein the fuel cell comprises
a first zone prone to a first rate of acid evaporation;
a second, different zone prone to a second, lower rate of acid evaporation; and
wherein the electrolyte precursor is in the first zone.

10. The fuel cell system of claim 1, wherein the fuel cell comprises an air flow conduit and the electrolyte precursor in the air flow conduit.

11. The fuel cell system of claim 1, wherein the electrolyte precursor is situated in the fuel cell system where heat activates the electrolyte precursor for generating the electrolyte.

12. The fuel cell system of claim 1, wherein the electrolyte precursor is situated in the fuel cell system where at least one of water or humidity activates the electrolyte precursor for generating the electrolyte.

13. The fuel cell system of claim 1, wherein the electrolyte precursor is situated in the fuel cell system where a chemical activates the electrolyte precursor for generating the electrolyte.

14. The fuel cell system of claim 1, wherein the electrolyte is different than the electrolyte precursor.

15. The fuel cell system of claim 1, wherein
the cell stack assembly includes a plurality of electrolyte retaining matrices; and
the generated electrolyte in at least some of the electrolyte retaining matrices is used to facilitate an electrochemical reaction used for generating electricity.

16. The fuel cell system of claim 1, wherein the generated electrolyte is a liquid electrolyte.

17. A phosphoric acid fuel cell, comprising:
a cathode;
an anode;
an electrolyte retaining matrix between the cathode and the anode;
at least one of the cathode, anode or electrolyte retaining matrix having a plurality of pores; and
a plurality of granules of an electrolyte precursor within at least some of the pores for generating a liquid electrolyte for use within the electrolyte retaining matrix for generating electricity.

18. The fuel cell of claim 17, wherein the generated electrolyte comprises phosphoric acid.

19. The fuel cell of claim 18, wherein the electrolyte precursor comprises phosphorous pentoxide.

20. The fuel cell of claim 17, comprising an acid condensation zone and wherein the electrolyte precursor is in the acid condensation zone.

21. The fuel cell of claim 17, comprising
a first zone prone to a first rate of acid evaporation;
a second, different zone prone to a second, lower rate of acid evaporation; and
wherein the electrolyte precursor is in the first zone.

22. The fuel cell of claim 17, comprising an air flow conduit with at least some of the electrolyte precursor in the air flow conduit.

23. The fuel cell of claim 17, wherein heat activates the electrolyte precursor for generating the electrolyte.

24. The fuel cell of claim 17, wherein at least one of water or humidity activates the electrolyte precursor for generating the electrolyte.

25. The fuel cell of claim 17, wherein a chemical activates the electrolyte precursor for generating the electrolyte.

* * * * *